ID
3,404,031
EMISSIVE COATING
Wilson A. Clayton, Joseph M. Gunderson, and John C. Sargent, Seattle, Wash., assignors to The Boeing Company, Seattle, Wash., a corporation of Delaware
No Drawing. Filed Sept. 3, 1963, Ser. No. 306,352
8 Claims. (Cl. 117—201)

ABSTRACT OF THE DISCLOSURE

A coating for application to refractory surfaces to enhance their emissivity having the following ingredients: (1) a pigment consisting of silicon carbide, boron carbide, titanium carbide or platinum black; (2) an emissivity enhancing doping agent consisting of carbon, silicon, boron, titanium or combinations thereof; and (3) a binder consisting of a suspension of water glass, silicon dioxide, boric oxide or phosphoric pentoxide.

---

This invention relates to a method of greatly increasing the emittance of material surfaces and to the related coatings and processes for achieving this departure from normal surface emittance.

Current penetrations into outer space have originated many scientific and engineering problems, not the least among which is achieving high temperature materials. The emphasis upon high temperature materials naturally is associated with the extreme temperatures encountered upon re-entry of spacecraft into the earth's atmosphere. Since vehicles during re-entry experience great heat shocks, a high emittance coating o nthe materials used in re-entry vehicles would greatly reduce the resulting thermal shock by rapid radiation of thermal energy away from the material's surface. Naturally, the utilization of this invention is not confined to use on re-entry vehicles but can be utilized anywhere a high emittance is required, such as in a high temperature furnace. Other systems requiring a high emittance can be obtained by reference to basic physics treatises.

Disilicide coatings and other equivalent coatings exhibit many desirable qualities as exterior coatings upon high temperature materials, as evidenced by their frequent use upon high temperature materials. As people associated with the emittance field are aware, disilicide coatings on refractory materials do not reliably possess high emittance at high temperature. The other equivalents, such as various oxide films, have also demonstrated unreliable emissive characteristics.

While there have been many attempts to increase the emittance of various specimens, a problem still exists in trying to approach the conditions of an ideal emitting body, commonly called an ideal black body. In addition, certain altered emissive coatings have other drawbacks such as spalling or other physical coating failures. Conventional approaches to increase emittance have utilized various coating formulations consisting of a pigment and a binder and an application technique of either first applying an adhesive coating and then applying a pigmented coating with subsequent temperature processing or applying a coating containing both pigment and adhesive components with subsequent temperature processing. As long as technology accepts these techniques as a standard way of producing high emittance coatings, the emissive coatings will be limited to the existing range of performance.

Therefore an object of this invention is to achieve a coating for re-entry vehicles with a greatly increased emittance over previous coatings, thus meeting the requirements of space vehicles.

An additional object of this invention will be to have an emissive coating structure which will not fail under serve thermal shock but will have thermal expansion characteristics capable of coping with the severe conditions encountered by space craft.

Still an additional object of this invention will be to have a coating possessing easy application, weather resistance, firm adherence, hardness and other desired properties for coatings.

This invention uses the spray, brush, dip or equivalent application of a primary pigmented coating and an adherence coating to the surfaces of refractory metal parts, disilicide coated refractory metal parts, ceramic parts and related materials requiring high emittance. The formulation of the initial coating is comprised of a high emittance pigment, a binder of suitable performance and a suspension medium. This coating possesses rapid drying characteristics which enable it to be used in industrial schedules. The coating also lends itself to baking operations, with the resulting advantage of forming a permanent bond between the coating and the material surface upon which the coating is applied.

One reason for the instant coating having characteristics superior to previous coatings is that we have originated a new pigment mechanism. Our new mechanism consists of an element or compound acting as a pigment with a controlled dispersion of an emittance-producing material within the element or compound. The dispersed emittance-producing material in minute concentrations greatly increases the emittance characteristics of the pigment used. Concentrations in the order of 0.01% to less than 10% of an emittance-producing material are sufficient. This mechanism also enables us to change the resulting emittance of the coating by altering its content within the pigment.

In order to achieve an emittance control, an emittance-producing material is added to the pigment as a doping material in a manner similar to the addition of a doping substance to transistor materials in order to achieve a control of properties. The exact explanation of this phenomenon regarding the increased emittance is uncertain but probably is related to the normal transparent tendencies of most pigment materials.

There is a preferred structure and surface finish for our coating which also distinguishes it from previous coating products. Cracking, spalling and similar failures of our coating system are prevented by the porous structure and consistently roughened surface finish. Pores in our primary coating provide space for binder expansion under high temperature conditions, paths for release of pressure from gases developed at high temperature within the coating or base material, and space for coating material expansion which may occur during high temperature reactions or phase changes within the coating. The influence and effect upon the reaction by the pores in the coating can be thought of as small shock absorbing systems lending themselves to the favorable operation of this coating at high temperatures.

Following the application of the primary pigmented coating, we apply an optional second coating which imparts good adhesion qualities to the coating composite. This adhesion coating is required in systems receiving much surface impact or abrasion as it serves to keep the primary coating intact.

Our method of coating application is not customary in the art in that previous procedure was either first to apply a primary adhesive coating to the substrate and then apply a top coating containing the pigments over the adhesive coating or to apply a pigmented adhesive coating alone. The previous practice resulted in unsatisfactory performance for us, so we used the new coating application technique of first applying the pigmented primary coating followed by the subsequent adherence-improvement coating. The success of this procedure may be explained because the pigment with its desired concentration of emittance-producing material is uniformly dispersed on the surface before the subsequent adherence-improvement coating is applied.

The formulation for the primary or pigmented coating is:

| Constituent: | Percentage by weight |
|---|---|
| Pigment | 23.30–94.0 |
| Binder | .33–28.5 |
| Suspension medium | 5.00–66.0 |
| Emittance-producing material in pigment | .01– 9.5 |

Our experience has enabled us to use silicon carbide, boron carbide, titanium carbide and platinum black as pigments. Emittance-producing materials successfully employed in these pigments are carbon, silicon, boron titanium and combinations thereof. Any cohesive material may be employed as a binder with suspensions of water glass, silicon dioxide, boric oxide and phosphoric pentoxide being examples. The suspension medium is required to be compatible with the binder and the pigment. Water is a satisfactory suspension medium meeting this requirement.

The formulation for the adherence-improvement coating is:

| Constituent: | Percentage by weight |
|---|---|
| Binder | 10–40 |
| Suspension medium | 60–90 |

Any non-reactive medium such as water makes an excellent suspension medium while the binder is the same system as used in the pigmented coating.

In preparing the pigmented coating the ingredients are mixed in the order given in the formulation. Mixing of the formulation ensues until any and all agglomerates have been dispersed. It is generally desirable to prepare the pigmented coating just prior to using, as some difficulty is encountered in remixing completely settled batches. To prevent such settling of the constituents over any appreciable period of time, constant agitation is required.

The surface texture of the pigmented coating is functionally sound when in a porous state. There are many ways of achieving this, one method being spray application. In practice the spray gun is adjusted to obtain dry application with the given pass rate. A dry application of the coating is preferred so that the resulting coating is porous. A wet application leaves too much liquid on the surface with a resulting running together of the material.

If the surface of the object to be coated is accessible and readily lends itself to such preparation, the part is first vapor degreased by using one of a number of suitable solvents, such as methyl ethyl ketone. Alkaline cleaning is practiced so that a water break-free surface is attained. Following this, the part is rinsed clean of the alkaline material in warm water with subsequent air drying.

Following the preliminary preparation of the surface of the material to be coated, a dry spray application of the pigmented coating is made with an allowed drying time in air of around fifteen minutes (without the application of heat). A multiplicity of pigmented coatings or a single pigmented coating can be applied. After application of the final pigmented coating, whether one or more, the part can be heated to facilitate a bond between the pigmented coat and the material surface. A typical baking operation would be for one hour at approximately 2000° F. This baking operation can be, and usually is, delayed until the final adherence-improvement coating is applied.

At this point in the coating application, the pigmented coating exhibits a uniform roughness to the unaided human eye. We have consistently been able to achieve a pigmented coating without the presence of agglomerations, voids, or cracks in the coating. Our coatings are of minimal thickness from the standpoint of a weight advantage. Normal practice is to attain a thickness of .002±.0005 inch. This thickness can be appreciably altered depending upon the requirements of the system on which the coating is used.

The adherence-improvement coating is next applied according to the above formulation. This coating is applied wet with a uniformity of application throughout the surface. This results in an even texture and porosity on the surface similar to that attained with the primary coating. The coated part goes through the same procedure of drying and baking as with the pigmented coating.

Many sample runs have been performed on a variety of materials establishing the above given ranges for both the pigmented coating and the adherence-improvement coating. The increased emittance of a disilicide base material after being subjected to our coating technique is 21% over a repeated number of experiments. Prior to coating the disilicide material the emissivity is .7; subsequent to coating the emissivity was .85. This increased emissivity is of great importance on a re-entry vehicle and provides passive cooling for the surface of the vehicle.

The primary or pigmented coating is formulated to yield an as-cured coating in the following composition range:

| Constituent: | Percentage by weight |
|---|---|
| Pigment | 70–99 (SiC) |
| Binder | 1–30 (SiO$_2$) |

Enough suspension medium is added (1) to dissolve or suspend the binder and (2) to prevent rapid curing during coating application. For the above composition range, a suspension medium quantity in the range 5 to 66% by weight is added to the initial formulation. Naturally during curing all the suspension medium volatilizes. As noted above, the addition of an emittance-producing material stays as a residue in the pigment of the as-cured coating. The emittance-producing material has a range of 0.007 to 10.0% contained within the pigment composition listed above.

We claim:

1. A pigment coating formulation comprised substantially as follows:

| Constituent: | Percentage by weight |
|---|---|
| Coating pigment | 23.00–94.00 |
| Coating binder | .30–28.50 |
| Water | 5.00–66.00 |
| Emittance-producing material in pigment | .002–9.50 | wherein the coating pigment is selected from the group consisting of boron carbide, silicon carbide, titanium carbide and platinum black, the binder is selected from the group consisting of water glass, silicon dioxide and phosphoric pentoxide and the emittance-producing material is selected from the group consisting of carbon, boron, silicon, titanium and combinations thereof.

2. A pigment coating formulation comprised substantially as follows:

| Constituent: | Percentage by weight |
|---|---|
| Doped coating pigment | 23.00–94.00 |
| Coating binder | .30–28.50 |
| Water | 5.00–66.00 | with the coating pigment being selected from the group consisting of silicon carbide, boron carbide, platinum black and titanium carbide containing .007 to 10.00 weight percent of an emittance-producing material selected from the group consisting of carbon, boron, silicon, titanium and combinations thereof, and the binder is selected from the group consisting of water glass, silicon dioxide and phosphoric pentoxide.

3. A method of making an emissive coating on an article comprising the steps of
(a) disposing on the surface of said article a pigment containing coating comprising

| Constituent: | Percentage by weight |
|---|---|
| Coating pigment | 23.00–94.00 |
| Coating binder | .30–28.50 |
| Water | 5.00–66.00 |
| Emittance-producing material in pigment | 0.002–9.50 | wherein the coating pigment is selected from the group consisting of boron carbide, silicon carbide, titanium carbide and platinum black, the binder is selected from the group consisting of water glass, silicon dioxide and phosphoric pentoxide, and the emittance-producing material is selected from the group consisting of carbon, boron, silicon, titanium and combinations thereof and
(b) disposing on the surface of said article a second, adherence coating comprising

| Constituent: | Percentage by weight |
|---|---|
| Binder | 10–40 |
| Suspension medium | 60–90 | wherein the binder is selected from the group consisting of water glass, silicon dioxide and phosphoric pentoxide and the suspension medium is water.

4. The method according to claim 3 wherein is performed the step of preliminarily preparing the surface of the article to be coated including vapor degreasing, alkaline cleaning and rinsing away the alkaline solution where these steps are needed to prepare the surface for the coating operations.

5. An article having thereon a coating system including a first coating comprising:

| Constituent: | Percentage by weight |
|---|---|
| Pigment | 70–99 |
| Binder | 1–30 | wherein the pigment is selected from the group consisting of silicon carbide, boron carbide, platinum black and titanium carbide containing 0.007 to 10.00 weight percent of an emittance-producing material selected from the group consisting of carbon, boron, silicon, titanium and combinations thereof, and the binder is selected from the group consisting of water glass, silicon dioxide and phosphoric pentoxide, and a second coating comprising a binder selected from the group consisting of water glass, silicon dioxide and phosphoric pentoxide.

6. An article comprising a structure having bonded thereon a coating substantially comprised as follows:

| Constituent: | Percentage by weight |
|---|---|
| Pigment | 69.993–98.993 |
| Binder | 1.000–30.000 |
| Emittance-producing material | .007–10.000 | wherein the pigment is selected from the group consisting of silicon carbide, boron carbide, titanium carbide and platinum black, the binder is selected from the group consisting of silicon dioxide, phosphoric pentoxide and boric oxide and the emittance-producing material is selected from the group consisting of carbon, boron, silicon, titanium and combinations thereof.

7. An article comprising a structure having bonded thereon a coating substantially comprised as follows:

| Constituent: | Percentage by weight |
|---|---|
| Pigment | 70–99 |
| Binder | 1–30 | with the pigment being selected from the group consisting of silicon carbide, boron carbide, titanium carbide and platinum black containing .007 to 10.00 weight percent of an emittance-producing material selected from the group consisting of carbon, boron, silicon, titanium and combinations thereof and the binder is selected from the group consisting of silicon dioxide, phosphoric pentoxide and water glass.

8. An article comprising a structure having bonded thereon a coating substantially comprised as follows:

| Constituent: | Percentage by weight |
|---|---|
| Pigment | 70–99 |
| Binder | 1–30 | with the pigment being silicon dioxide containing .007 to 10.00 weight percent of an emittance-producing material selected from the group consisting of carbon, boron, silicon, titanium and combinations thereof and the binder is silicon dioxide.

References Cited

UNITED STATES PATENTS

| 2,925,357 | 2/1960 | Kothen | 117—169 X |
| 2,964,420 | 12/1960 | Poorman et al. | 117—127 X |
| 3,095,316 | 6/1963 | Hartwig | 117—169 X |
| 3,167,439 | 1/1965 | Vukasovich et al. | 117—135.1 X |
| 3,275,471 | 9/1966 | Lowell et al. | 117—98 X |

RALPH S. KENDALL, *Primary Examiner.*

H. COHEN, *Assistant Examiner.*